(12) United States Patent
Lee et al.

(10) Patent No.: US 8,520,057 B2
(45) Date of Patent: Aug. 27, 2013

(54) METHOD AND SYSTEM FOR TRANSMITTING/RECEIVING 3-DIMENSIONAL BROADCASTING SERVICE

(75) Inventors: Gwang-Soon Lee, Daejeon (KR); Kug-Jin Yun, Daejeon (KR); Hyun Lee, Daejeon (KR); Bong-Ho Lee, Daejeon (KR); Namho Hur, Daejeon (KR); Jin-Woong Kim, Daejeon (KR); Soo-In Lee, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 379 days.

(21) Appl. No.: 12/612,075

(22) Filed: Nov. 4, 2009

(65) Prior Publication Data
US 2010/0141738 A1    Jun. 10, 2010

(30) Foreign Application Priority Data

Nov. 4, 2008   (KR) .................. 10-2008-0108888
May 19, 2009   (KR) .................. 10-2009-0043731
May 19, 2009   (KR) .................. 10-2009-0043732

(51) Int. Cl.
*H04N 15/00*    (2006.01)
*H04N 13/00*    (2006.01)

(52) U.S. Cl.
USPC ............................ 348/43; 348/42; 348/725

(58) Field of Classification Search
USPC ................ 348/42, 43, 723, 725; 725/62, 63, 725/105, 114; 709/231, 232
See application file for complete search history.

(56) References Cited

U.S. PATENT DOCUMENTS

| | | | |
|---|---|---|---|
| 5,001,555 A * | 3/1991 | Park | 348/43 |
| 7,650,036 B2 * | 1/2010 | Lei et al. | 382/232 |
| 2002/0009137 A1 * | 1/2002 | Nelson et al. | 375/240.1 |
| 2010/0034140 A1 * | 2/2010 | Song et al. | 370/328 |
| 2010/0277568 A1 * | 11/2010 | Yun et al. | 348/43 |

FOREIGN PATENT DOCUMENTS

| | | |
|---|---|---|
| KR | 1020050111379 A | 11/2005 |
| KR | 20060013818 A | 2/2006 |
| KR | 1020070058302 A | 6/2007 |
| KR | 1020070060951 A | 6/2007 |
| KR | 1020070061227 A | 6/2007 |
| KR | 1020080053194 A | 6/2008 |
| WO | WO 2007064159 A1 * | 6/2007 |

* cited by examiner

*Primary Examiner* — Mohamed Ibrahim
(74) *Attorney, Agent, or Firm* — Ladas & Parry LLP

(57) ABSTRACT

Provided is a method and system for transmitting/receiving broadcasting service. The method for transmitting a 3-dimensional broadcasting service includes: encoding a reference image and an additional image of the 3-dimensional broadcasting service to generate a reference image stream and an additional image stream; receiving a service map table defining the 3-dimensional broadcasting service; and transmitting the reference image stream, the additional image stream and the service map table in real time.

24 Claims, 14 Drawing Sheets

FIG. 6

| Syntax | Number of bits | Note |
|---|---|---|
| service_map_table_MH_section() {<br>    table_id<br>    :<br>    table_id_extension {<br>        SMT_MH_protocol_version<br>        ensemble_id<br>    }<br>    :<br>    for (i=0; i<num_MH_services; i++)<br>    {<br>        Reserved<br>        multi_ensemble_service<br>        :<br>        MH_service_id<br>        :<br>        MH_service_category<br>        :<br>        source_IP_address<br>        :<br>        MH_service_destination_IP_address<br>        :<br>        for (j=0; j<num_components; j++)<br>        {<br>            :<br>            component_destination_UDP_port_num<br>            component_destination_IP_address<br>            :<br>            for (k=0; k<num_component_level_descriptors; k++)<br>            {<br>                :<br>                component_level_descriptor()<br>                :<br>            }<br>        } :<br>        MH_service_level_descriptor()<br>        :<br>} | <br>8<br><br>8<br>8<br><br><br><br>3<br>2<br><br>16<br><br>6<br><br>32 or 128<br><br>32 or 128<br><br><br><br><br><br>16<br>32 or 128<br><br><br><br><br><br>Var<br><br><br><br><br><br>Var | <br><br><br><br><br><br><br><br><br>'01' or '10'<br><br><br><br>Define 3D service newly<br><br><br><br><br><br><br><br><br><br><br><br><br><br><br><br>3D additional image<br>information description<br><br><br><br><br>3D service information<br>description |

FIG. 7

| Syntax | Number of bits | |
|---|---|---|
| MH_component_descriptor() {      descriptor_tag      descriptor_length      component_type      :      MH_component_ data(component_type)  } | 8  8  7  var | Define additional image component type newly  3D additional image related information |

FIG. 8

| component_type | Meaning |
|---|---|
| 0-34 | Assigned or reserved by IANA, except that 20?24, 27, and 29-30 are unassigned |
| 35 | H.264/AVC video stream component (assigned by ATSC for M/H use) |
| 36 | SVC enhancement layer stream component (assigned by ATSC for M/H use) |
| : | : |
| 43 | Auxiliary stream component |
| : | : |

FIG. 9

| Syntax | Number of bits | |
|---|---|---|
| MH_component_ data() { | | |
|   3D_additional_data_type | 3 | |
|   dependency_flag | 1 | |
|   if (dependency_flag ='1') { | | |
|       MH_service_id | 16 | Reference location information |
|       IP_address | 32 or 128 | |
|       UDP_Port_num | 16 | |
|       : | | |
|   } | | |
|   depth_parameter_flag | 1 | |
|   if (depth_parameter_flag='1') { | | |
|       Knear | 8 | |
|       Kfar | 8 | |
|   } | | |
|   disparity_parameter_flag | 1 | |
|    if (disparity_parameter_flag ='1') { | | |
|       min_disparity | 8 | |
|       min_disparity | 8 | |
|   } | | |
|   : | | |
| } | | |

FIG. 10

| Value | Related information |
|---|---|
| 000 | Left image (full) |
| 001 | Left image (half of horizontal) |
| 010 | Left image (half of vertical) |
| 011 | Right image (full) |
| 100 | Right image (half of horizontal) |
| 101 | Right image (half of vertical) |
| 110 | Disparity |
| 111 | Depth |

FIG. 11

| Syntax | Number of bits | Note |
|---|---|---|
| 3D_service_descriptor () {<br>    descriptor_tag<br>    descriptor_length<br>    layer_id<br>    StereoMono_service_flag<br>    If (StereoMono_service_flag) {<br>        3D_service_type<br>        3D_composition_type<br>    LR_first<br>        :<br>    }<br>    :<br>} | : | : |

FIG. 12

| Value | 3D_composition_type |
|---|---|
| 000 | Reserved |
| 001 | Side-by-side type |
| 010 | Vertical line interleaved type |
| 011 | Horizontal line interleaved type |
| 100 | Frame sequential type |
| 101 | Dual frame type |
| 110~111 | Reserved |

FIG. 15

| Syntax | Number of bits | Note |
|---|---|---|
| NRT_information_table_section() {<br>    table_id<br>    :<br>    service_id<br>    :<br>    num_items_in_section<br>    for (j=0; j< num_items_in_section; j++) {<br>        content_linkage<br>        :<br>        content_descriptors_length<br>        for (i=0; i<N; i++) {<br>            content_descriptor()<br>        }<br>        :<br>    }<br>    reserved<br>    descriptors_length<br>    descriptor()<br>    }<br>} | : | Divide reference image or<br>3D additional image content file<br><br>Add 3D content file information |

FIG. 16

| Descriptor Name | Descriptor Tag | Reference and Description | | |
|---|---|---|---|---|
| Media type descriptor | TBD | Arrange media type information | | |
| .. | .. | A/153 Part 3 [x] Sec. 7.8.1. The following component types are applicable for NRT-IT use: | | |
| | | component type | Meaning | |
| | | 35 | H.264/AVC video stream | |
| | | 36 | SVC enhancement layer stream | |
| | | 37 | HE AAC v2 audio stream | |
| | | 39 | STKM stream component | |
| | | 40 | LTKM stream component | |
| | | 43 | 3D auxiliary component | |

FIG. 18

| | 3D Service Descriptor of SMT_TH | M/H Component Descriptor of SMT_TH | content_descriptor of NRT_IT |
|---|---|---|---|
| Real-time 3D broadcast | 3D_service_type: Real-time | : | : |
| Real-time/ nonreal-time hybrid 3D broadcast | 3D_service_type: Real-time/nonreal-time hybrid 3D_composition_type: Dual frame type | Component #1 (Reference image) Compontent_type: H.264/AVC video stream | |
| | | Component #2 (3D additional image) Compontent_type : FLUTE file delivery session | Contents #1 (Additional image) Content_linkage : 3D additional image content file indication Compontent_type : 3D auxiliary component Dependeny_Flag of MH_component_ data() : 1 (Cross-reference encoding) or 0 (Simulcast encoding) |
| Nonreal-time 3D broadcast | 3D_service_type: Nonreal-time 3D_composition_type: Dual frame type | Component #3 (Reference image) Compontent_type : FLUTE file delivery session | Contents #2 (Reference image) Content_linkage : Reference image content file indication Compontent_type of M/H component descriptor : H.264/AVC video stream (or Media_type() of Media type descriptor : Certain media type) |
| | | Component #4 (3D additional image) Compontent_type : FLUTE file delivery session | Contents #3 (Additional image) Content_linkage : 3D additional image content file indication Compontent_type of M/H component descriptor : 3D auxiliary component (or Media_type() of Media type descriptor : Certain media type) MH_component_ data()의 dependeny_Flag : 1 (Cross-reference encoding) or 0 (Simulcast encoding) |
| | 3D_service_type : Nonreal-time 3D_composition_type: single frame type (side-by-side etc.) | Component #5 (Single image; Multiplexed reference image/ 3D additional image) Compontent_type : FLUTE file delivery session | Contents #4 (Single image) Content_linkage : Single image content file indication Compontent_type of M/H component descriptor : H.264/AVC video stream (or Media_type() of Media type descriptor: Certain media type) |

METHOD AND SYSTEM FOR TRANSMITTING/RECEIVING 3-DIMENSIONAL BROADCASTING SERVICE

CROSS-REFERENCE(S) TO RELATED APPLICATIONS

The present application claims priority of Korean Patent Application Nos. 10-2008-0108888, 10-2009-0043731 and 10-2009-0043732 filed on Nov. 4, 2008, May 19, 2009 and May 19, 2009, respectively, which are incorporated herein by reference in their entirety.

BACKGROUND OF THE INVENTION

1. Field of the Invention

Exemplary embodiments of the present invention relates to a method and system for transmitting/receiving a broadcasting service; and, more particularly, to a method and system for transmitting/receiving a 3-dimensional broadcasting service.

2. Description of Related Art

The ATSC-M/H (Advanced Television Systems Committee-Mobile/Handheld) standards have been developed to improve the mobile reception performance of the ATSC that provides a high-definition TV service in a indoor stationary reception environment. The ATSC-M/H provides a mobile multimedia service to a portable terminal by adding a separate system while maintaining the conventional ATSC system and network. Thus, it is possible to simultaneously provide, through one RF signal, a high-definition TV service to a conventional ATSC TV and a mobile multimedia service to an ATSC-M/H dedicated portable terminal. The ATSC-M/H is characterized in that it provides insertion of an extra training sequence for improvement of the mobile reception performance, insertion of an synchronization signal considering an interleaver, improvement of the transmission performance of dual FEC codes, a parade burst transmission scheme similar to time slicing for minimization of the power consumption of a portable terminal, and service-independent channel coding.

The ATSC-M/H constructs an M/H parade with a series of consecutive group numbers and slot numbers for a parade burst transmission scheme. A transmitting terminal transmits one or two ensembles through an M/H parade and transmits bit streams, encoded by the same FEC, for a predetermined time in a burst manner. Thus, an M/H receiver may receive and FEC-decodes only a parade including a necessary service, thus reducing the power consumption.

In the ATSC-M/H, a service is a series of programs and an ensemble is a set of services encoded by the same FEC. Because ensembles can be FEC-encoded at different levels, they are encoded using independent Read-Solomon (RS) frames. In the ATSC-M/H, an RS frame is a basic unit for encapsulating and RS-encoding IP datagrams. The RS frame includes a primary RS frame and a secondary RS frame. Basically, an ATSC-M/H transmitter multiplexes desired multimedia data by IP protocol.

Meanwhile, a 3-dimensional image includes a reference image and various types of 3D additional images (hereinafter referred to as additional images). The two images are converted respectively into left/right images and they are displayed through 3-dimensional display, thereby enabling a viewer to enjoy stereoscopic images. Examples of the additional images include a half vertical (horizontal) right image, a full right image, and a depth image. If the additional image is a half vertical right image, the reference image and the additional image are converted respectively to images with only odd (even) line image data and even (odd) line image data and then left/right field images are simultaneously displayed on a 3-dimensional display at the same location in a scene.

As described above, a 3-dimensional image includes a reference image and an additional image. Therefore, transmission/reception of a reference image and an additional image is necessary to provide a mobile broadcasting service according to the ATSC M/H standards. However, the conventional ATSC standard, i.e., the broadcasting standard based on two-dimensional images transmits/receives only a single image. What is therefore required is a more efficient method for providing a 3-dimensional broadcasting service compatible with a two-dimensional broadcasting service.

SUMMARY OF THE INVENTION

An embodiment of the present invention is directed to 3-dimensional broadcasting service transmitting/receiving method and system for providing 3-dimensional broadcasting services more efficiently by using conventional broadcasting networks.

Another embodiment of the present invention is directed to 3-dimensional broadcasting service transmitting/receiving method and system that can provide a 3-dimensional image including a reference image and an additional image in real time or nonreal time through an ATSC-M/H broadcasting network.

Another embodiment of the present invention is directed to 3-dimensional broadcasting service transmitting/receiving method and system that can minimize the restriction caused by an additional transmission channel by maximal utilization of conventional broadcasting networks and can provide the compatibility with conventional two-dimensional broadcasting services.

In accordance with an embodiment of the present invention, a method for transmitting a 3-dimensional broadcasting service includes: encoding a reference image and an additional image of the 3-dimensional broadcasting service to generate a reference image stream and an additional image stream; receiving a service map table defining the 3-dimensional broadcasting service; and transmitting the reference image stream, the additional image stream and the service map table in real time.

In accordance with another embodiment of the present invention, a method for receiving a 3-dimensional broadcasting service includes: receiving in real time a broadcast signal including a reference image stream and an additional image stream of the 3-dimensional broadcasting service and a service map table defining the 3-dimensional broadcasting service; acquiring the reference image stream, the additional image stream and the service map table from the broadcast signal; and decoding the reference image stream and the additional image stream by means of the service map table.

In accordance with another embodiment of the present invention, a system for transmitting a 3-dimensional broadcasting service includes: an encoding unit configured to encode a reference image and an additional image of the 3-dimensional broadcasting service to generate a reference image stream and an additional image stream; an input unit configured to receive a service map table defining the 3-dimensional broadcasting service; and a transmitting unit configured to transmit the reference image stream, the additional image stream and the service map table in real time.

In accordance with another embodiment of the present invention, a system for receiving a 3-dimensional broadcasting service includes: a receiving unit configured to receive in real time a broadcast signal including a reference image stream and an additional image stream of the 3-dimensional broadcasting service and a service map table defining the 3-dimensional broadcasting service; a signal processing unit configured to acquire the reference image stream, the additional image stream and the service map table from the broadcast signal; and a decoding unit configured to decode the reference image stream and the additional image stream by means of the service map table.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

BRIEF DESCRIPTION OF THE DRAWINGS

FIG. 6 is a diagram illustrating field values of an SMT-MH section for signaling a 3-dimensional broadcasting service in an embodiment of the present invention.

FIG. 7 is a diagram illustrating the definition of component description information in an embodiment of the present invention.

FIG. 8 is a diagram illustrating the definition of component type information in an embodiment of the present invention.

FIG. 9 is a diagram illustrating the definition of component data information in an embodiment of the present invention.

FIG. 10 is a diagram illustrating the definition of additional image type information in an embodiment of the present invention.

FIG. 11 is a diagram illustrating the definition of 3-dimensional broadcasting service description information for providing 3-dimensional broadcasting service information in an embodiment of the present invention.

FIG. 12 is a diagram illustrating the definition of 3-dimensional image structure information in an embodiment of the present invention.

FIG. 15 is a diagram illustrating the definition of a nonreal-time information table in an embodiment of the present invention.

FIG. 16 is a diagram illustrating the definition of a content level descriptor of a nonreal-time information table in an embodiment of the present invention.

FIG. 18 is a table illustrating components included in a service signaling table according to the type of a 3-dimensional broadcasting service in an embodiment of the present invention.

DESCRIPTION OF SPECIFIC EMBODIMENTS

Figure 1:
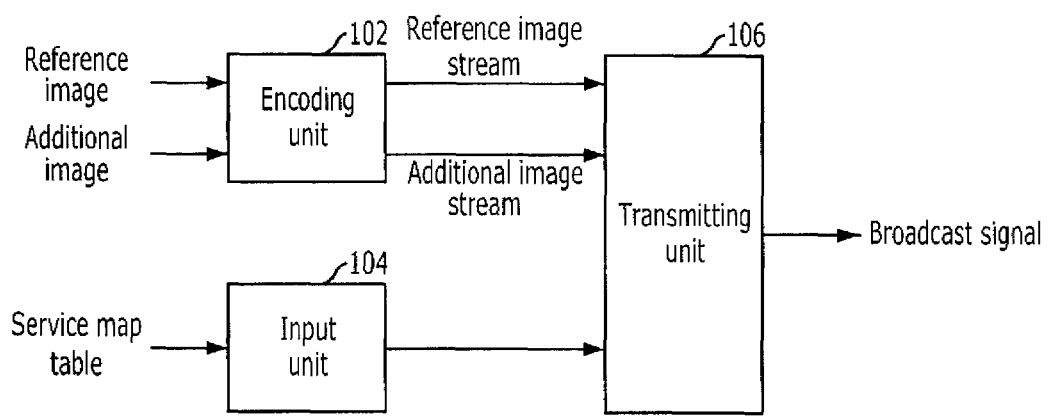
FIG. 1 is a block diagram of a system for transmitting a 3-dimensional broadcasting service in accordance with an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

FIG. 1 is a block diagram of a system for transmitting a 3-dimensional broadcasting service in accordance with an embodiment of the present invention.

Referring to FIG. 1, a method for transmitting a 3-dimensional broadcasting service in accordance with an embodiment of the present invention includes an encoding unit 120, an input unit 104, and a transmitting unit 106. The encoding unit 102 encodes a reference image and an additional image of a 3-dimensional broadcasting service to generate a reference image stream and an additional image stream. Although not illustrated in FIG. 1, the encoding unit 102 may encode an audio corresponding to a reference image and an additional image to generate an audio stream. Both of the reference image and the additional image may be encoded and transmitted in real time or in nonreal time.

The input unit 104 receives a service map table. The service map table is used to define a 3-dimensional broadcasting service provided by the system for transmitting a 3-dimensional broadcasting service. The service map table may include service identification (ID) information, multi-ensemble information, service type information, component description information, and service description information.

If at least one of the reference image and the additional image is encoded and transmitted in nonreal time, the input unit 104 receives a nonreal-time information table. The nonreal-time information table is used to provide a nonreal time (NRT) 3-dimensional broadcasting service. The nonreal-time information table contains information that is necessary for a receiving system to download a plurality of contents. The nonreal-time information table may include a content title, a download effective time, and content ID information.

The transmitting unit 106 transmits the reference image stream, the additional image stream or the service map table in real time or in nonreal time. If transmitting at least one of the reference image stream and the additional image stream in nonreal time, the transmitting unit 106 may simultaneously transmit the nonreal-time information table inputted through the input unit 104.

Also, the transmitting unit 106 may perform service multiplexing, IP encapsulation, M/H frame generation, channel coding, and modulation to transmit the reference image stream, the additional image stream, and the service map table.

Figure 2:
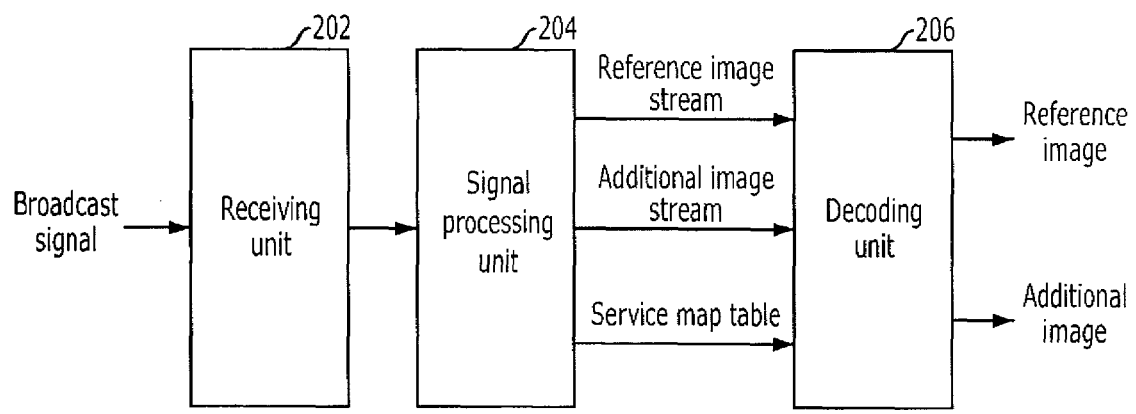
FIG. 2 is a block diagram of a method for receiving a 3-dimensional broadcasting service in accordance with an embodiment of the present invention.

FIG. 2 is a block diagram of a system for receiving a 3-dimensional broadcasting service in accordance with an embodiment of the present invention.

Referring to FIG. 2, a system for receiving a 3-dimensional broadcasting service in accordance with an embodiment of the present invention includes a receiving unit 202, a signal processing unit 204, and a decoding unit 206. The receiving unit 202 receives a broadcast signal, including a reference image stream, an additional image stream and a service map table of a 3-dimensional broadcasting service, in real time or in nonreal time. If receiving at least one of the reference image stream and the additional image stream in nonreal time, the receiving unit 202 may simultaneously receive a nonreal-time information table. Also, the receiving unit 202 may perform 8 VSB demodulation and channel decoding.

The signal processing unit 204 acquires a reference image stream, an additional image stream and a service map table from the received broadcast signal. Also, in channel search, the signal processing unit 204 may perform analysis of effective services and the corresponding ensemble information, extraction of an RS frame in a parade corresponding to a specific service, interpretation of a service map table or a nonreal-time information table, and IP decapsulation.

The decoding unit 206 decodes the reference image stream and the additional image stream by means of the service map table. Although not illustrated in FIG. 2, the decoding unit 206 may decode an audio corresponding to the reference image stream and the additional image stream.

Hereinafter, a detailed description will be given of 3-dimensional broadcasting service transmitting/receiving method and system in accordance with embodiments of the present invention.

Embodiment 1

Figure 3:
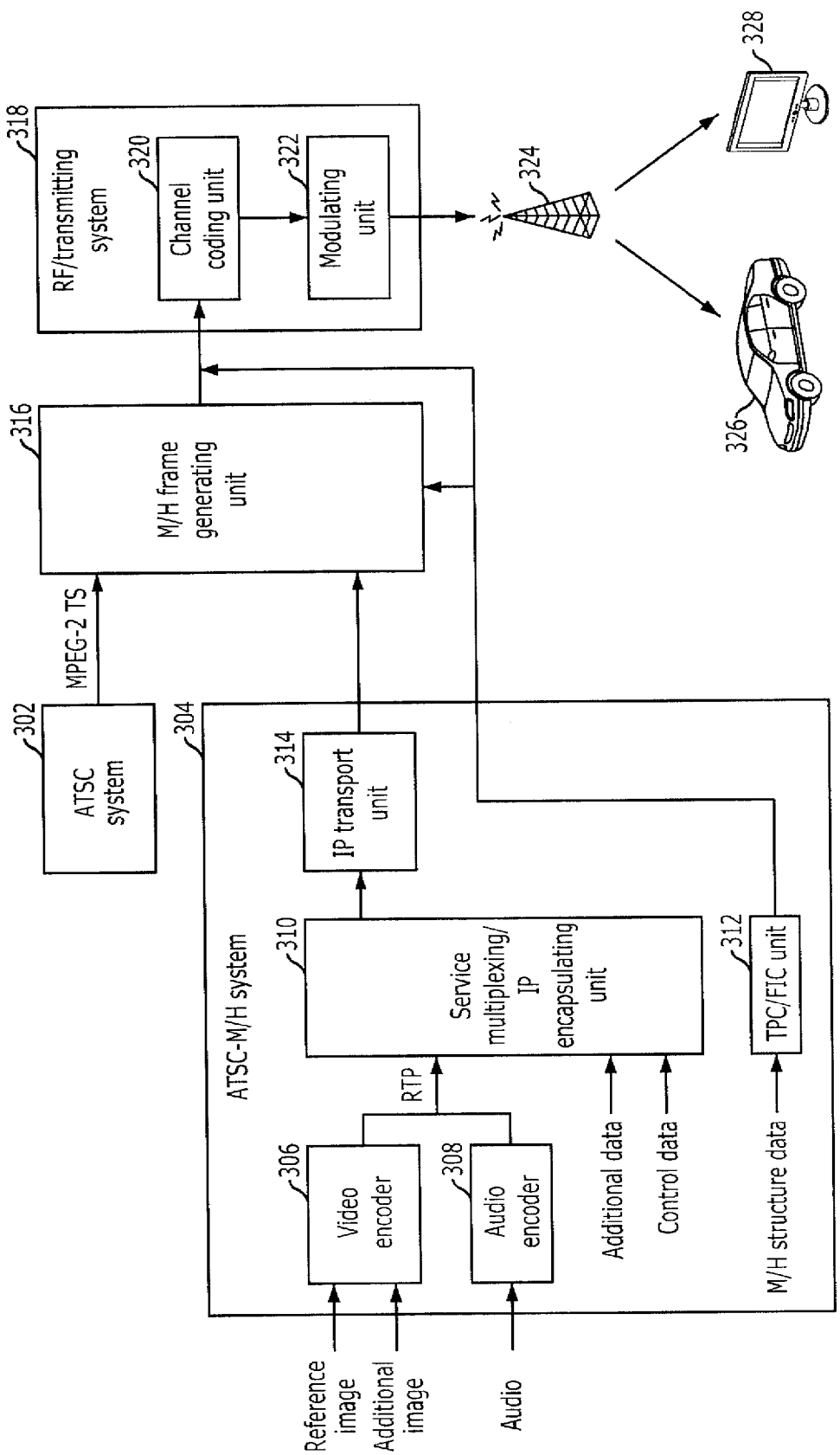
FIG. 3 is a block diagram of a system for transmitting a 3-dimensional broadcasting service in accordance with a first embodiment of the present invention.

FIG. 3 is a block diagram of a system for transmitting a 3-dimensional broadcasting service in accordance with a first embodiment of the present invention.

Referring to FIG. 3, a system for transmitting a 3-dimensional broadcasting service in accordance with a first embodiment of the present invention includes an ATSC system 302 for providing a conventional high-definition TV service, an ATSC-M/H system 304 for providing a mobile broadcasting service, an M/H frame generating unit 316 for generating an M/H frame by multiplexing transport streams outputted from the ATSC system 302 and the ATSC-M/H system 304, and an RF/transmitting system 318 for performing channel coding and 8 VSB modulation to transmit an RF signal.

The ATSC system 302 encodes and multiplexes a video/audio elementary stream. Herein, the transport stream includes an MPEG-2 transport stream (TS). However, in the case of the ATSC-M/H system 304, the video/audio elementary stream includes an IP stream based on RTP protocol.

The ATSC-M/H system 304 includes a video encoder 306, an audio encoder 308, a service multiplexing/IP encapsulating unit 310, a transmission parameter channel/fast information channel (TPC/FIC) unit 312, and an IP transport unit 314. The video encoder 306 receives and encodes a 3-dimensional image including a reference image and an additional image. Herein, the service multiplexing/IP encapsulating unit 310 synchronizes the two images by RTP protocol. Depending on various types of input 3-dimensional images, the video encoder 306 may include an independent encoder or a correlative encoder dedicated to a stereoscopic video.

The audio encoder 308 receives and encodes an audio corresponding to the 3-dimensional image inputted to the video encoder 306.

The service multiplexing/IP encapsulating unit 310 receives and multiplexes additional data, control data, and the encoded video and audio outputted from the video encoder 306 and the audio encoder 308. Thereafter, the service multiplexing/IP encapsulating unit 310 generates an IP datagram packet according to UDP/IP protocol. Herein, the control data includes the detailed information and structures of services provided through IP streams. The control data are generated and multiplexed in a separate IP stream.

The TPC/FIC unit 312 receives M/H structure data to generate transmission parameters and binding information between a physical transmission channel and a logical service that enables a fast access to an M/H service. The generated information is used for frame generation by the M/H frame generating unit 316 and channel coding by a channel coding unit 320 of the RF/transmitting system 318, and is transmitted over a TPC/FIC channel that is a signaling channel.

The IP stream generated by the service multiplexing/IP encapsulating unit 310 is transferred through the IP transport unit 314 to the M/H frame generating unit 316. The M/H frame generating unit 316 generates an M/H frame by means of the received IP stream and transfers the M/H frame to the channel coding unit 320 of the RF/transmitting system 318. The channel-coded M/H frame is modulated by a modulating unit 322 of the RF/transmitting system 318, and the resulting signal is broadcasted through an antennal 324. The broadcasted signal is received through a television (TV) 328 or a receiving terminal installed in a vehicle 326.

Figure 4:
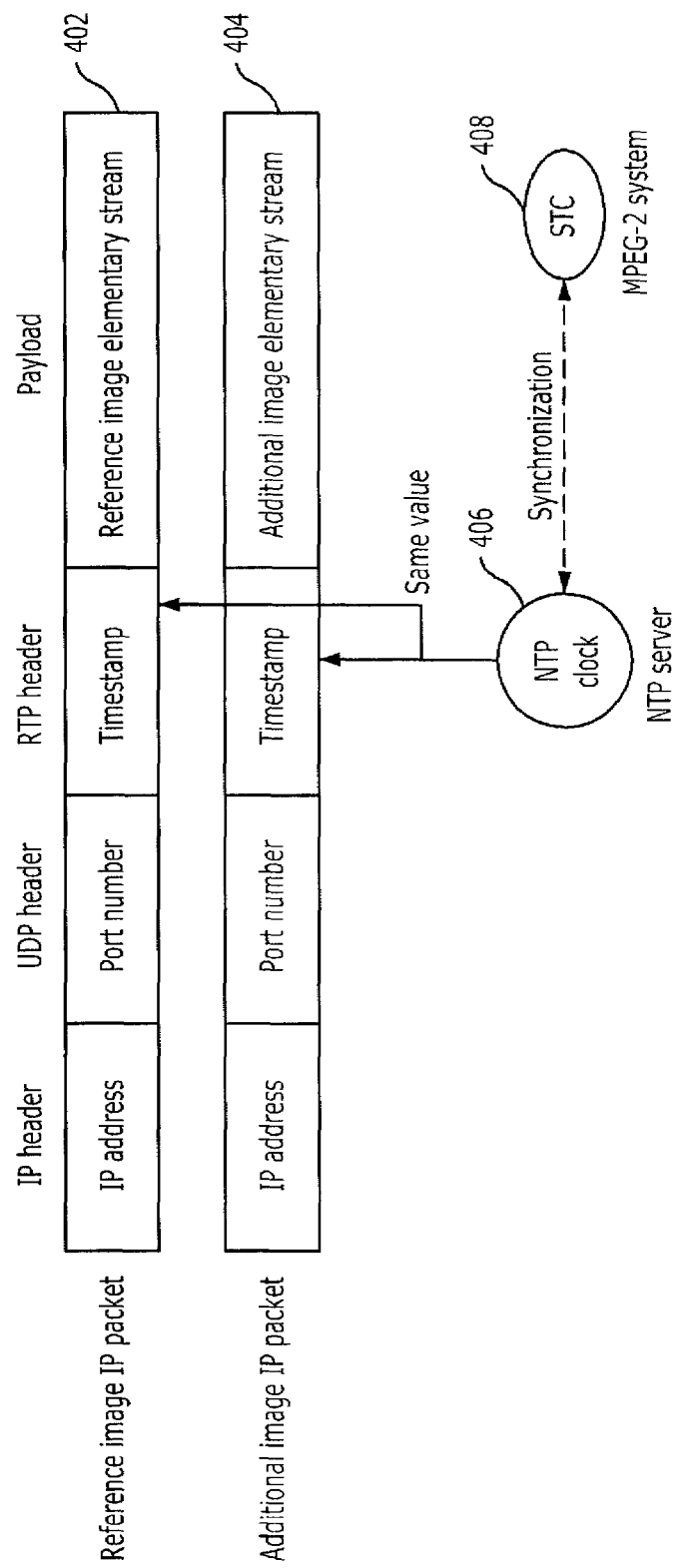
FIG. 4 is a diagram illustrating a structure of an IP transport stream for transmission of a 3-dimensional broadcasting service in an embodiment of the present invention.

FIG. 4 is a diagram illustrating a structure of an IP transport stream for transmission of a 3-dimensional broadcasting service in an embodiment of the present invention.

Referring to FIG. 4, RTP protocol uses a timestamp insertion scheme for time synchronization between media data (video, audio and other contents) transmitted in an IP stream format. A timestamp value to be inserted in an RTP packet is extracted by a network time protocol (NTP) clock 406 of an NTP server. Also, in order to set a reference time, the timestamp value is transmitted as a separate IP packet at predetermined intervals.

A reference image IP packet 402 and an additional image IP packet 404 correspond to each other on a temporal basis. Thus, the same timestamp extracted by the NTP clock 406 is inserted in the reference image IP packet 402 and the additional image IP packet 404. Also, the reference image IP packet 402 and the additional image IP packet 404 are discerned by addresses (a source address and a destination address) of IP headers or port numbers of UDP headers. This packet structure may vary according to the network structures and the video encoder structures depending on the types of 3-dimensional images.

Meanwhile, the system for transmitting a 3-dimensional broadcasting service illustrated in FIG. 3 may need time synchronization with general video/audio streams transmitted by the ATSC system 302. In this case, the STSC system 302 interlocks and synchronizes the NTP clock 406 of the NTP server and a system time clock (STC) 408 used to extract system time information of an MPEG-2 TS, thereby implementing media synchronization between the ATSC system 302 and the ATSC-M/H system 304.

Figure 5:
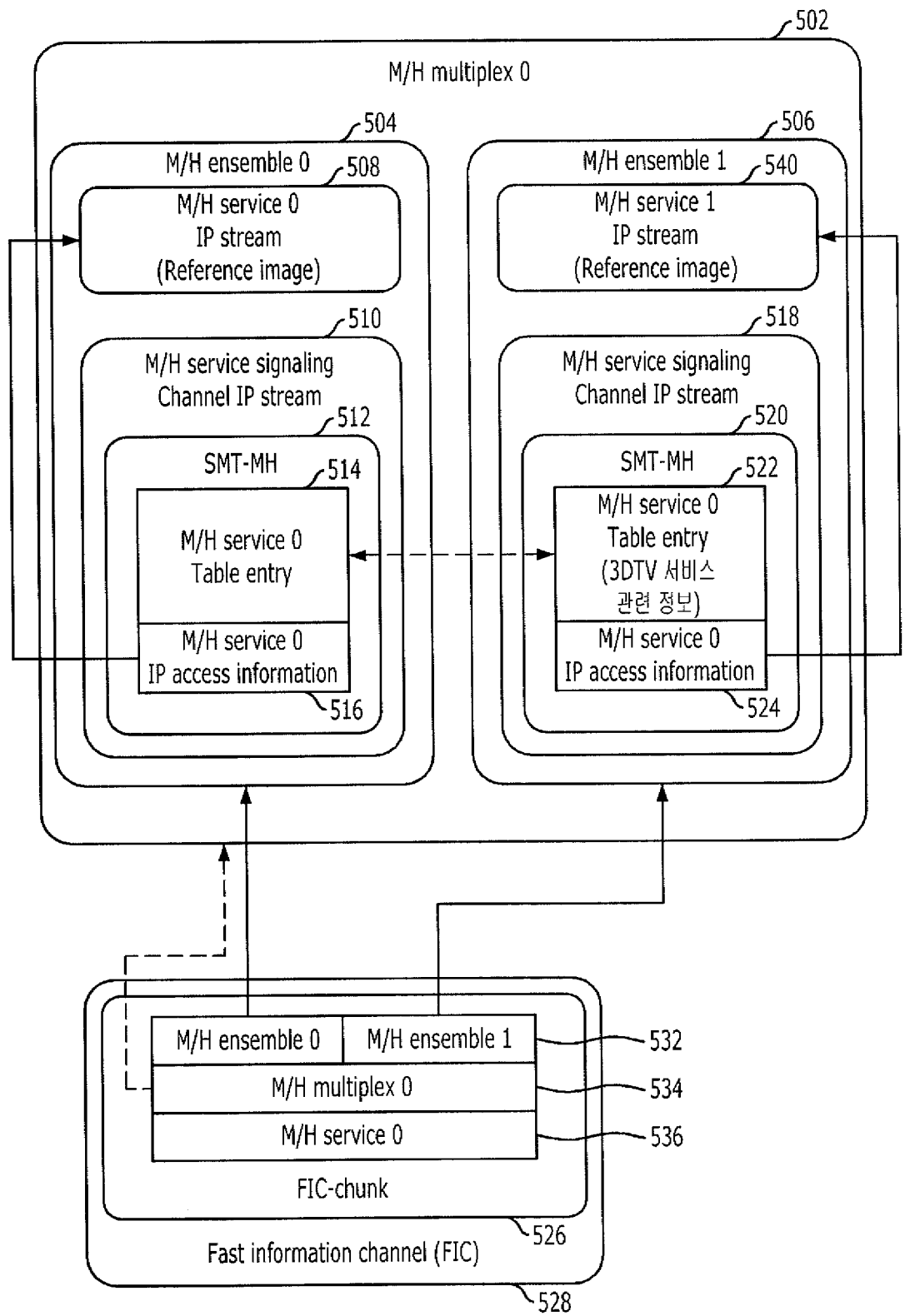
FIG. 5 is a diagram illustrating an M/H multiplex and a related signaling method for a 3-dimensional broadcasting service by an ATSC-M/H system in an embodiment of the present invention.

FIG. 5 is a diagram illustrating an M/H multiplex and a related signaling method for a 3-dimensional broadcasting service by an ATSC-M/H system in an embodiment of the present invention.

Referring to FIG. 5, the ATSC-M/H system performs service signaling to a receiving terminal in a hierarchical structure. In the first step, it provides binding information between a service and an ensemble through a fast information channel (FIC) 526. In the next step, the ATSC-M/H system provides detailed information through a service map table-MH (SMT-MH) transmitted in an M/H service signaling channel IP stream. The service map table includes IP addresses for all services, detailed information of service components constituting a service, and other description information.

In an embodiment of the present invention, IP streams for a reference image and an additional image may be transmitted throughout two ensembles (an M/H ensemble 0 504 and an M/H ensemble 1 506) in consideration of the compatibility with a general two-dimensional broadcasting service. In FIG. 5, two IP streams 508 and 540 constitute the same service (service 0).

Also, detailed description information about a 3DTV service including additional image related information is transmitted through a service map table (SMT-MH) for an additional image. If necessary, a simple descriptor in a 3DTV service level is included in a service map table for a reference image. Thus, a receiving terminal of a user desiring to receive only two-dimensional broadcast may perform an FEC decoding operation by receiving only a parade carrying the M/H ensemble 0 504, and a receiving terminal of a user desiring to receive 3-dimensional broadcast may perform an FEC decoding operation by receiving both of the two M/H ensembles 504 and 506. Accordingly, the receiving terminal of the user desiring to receive only two-dimensional broadcast can minimize the power consumption and can also overcome the limitation of compatibility with 3-dimensional broadcast.

Meanwhile, in the case of a low-efficiency receiving terminal, two ensembles of a parade may be simultaneously transmitted. However, in this case, the power consumption reduction effect decreases.

In an embodiment of the present invention, the same MH_service_id value is allocated to the service map tables of a reference image and an additional image, so that the two services are interlocked for a 3-dimensional image to indicate one service.

In the case of providing only 3-dimensional broadcast, one ensemble may include both of the IP streams for a reference image and an additional image. In this case, one service may be divided into two components (Set num_components=2 in the service map table).

The 3-dimensional broadcasting service described with reference to FIG. 5 is for a dual frame type dividing a reference image and an additional image, and single-frame side-by-side service/component structures are the same as those of general two-dimensional broadcast.

FIG. 6 is a diagram illustrating field values of an SMT-MH section for signaling a 3-dimensional broadcasting service in an embodiment of the present invention.

Referring to FIG. 6, in a service map table (SMT-MH), ensemble_id and MH_service_id are service ID information for identifying a service. Multi ensemble service is multi-ensemble information, which is a field indicating that the service is constructed throughout two ensembles. The multi-ensemble information is a value determined according to the encoding relationship between streams transmitted through two ensembles, which is set t '01' or '10' according to the type of an additional image elementary stream.

MH_service_category is service type information representing the type of the service, which newly defines a value (e.g., 0x0E) representing a 3-dimensional broadcasting service. IP address (source_IP_address or MH_service_destination_IP_address, component_destination_IP_address) and component_destination_UDP_port_num represent the IP address and the UDP port number of an IP stream for an additional image stream.

Component_level_descriptor( ) is component description information, which is a descriptor for describing all the service components included in the service. The definition of the component description information is shown in FIG. 7.

Referring to FIG. 7, component_type is component type information, which defines the encoding format of service components. In an embodiment of the present invention, a format for encoding an additional image is added as illustrated in FIG. 8 (e.g., component_type=43).

FIG. 9 is a diagram illustrating the definition of component data information in an embodiment of the present invention.

MH_component_data( ) according to component type information (component_type), i.e., component data information is defined in the component description information of FIG. 7. FIG. 9 illustrates the definition of component data information in the component description information when component type information, i.e., component_type is defined as a 3-dimensional additional image.

Referring to FIG. 9, the component data information includes additional image type information (3d_additional_data_type) and additional image determination information (dependency_flag).

FIG. 10 is a diagram illustrating the definition of additional image type information in an embodiment of the present invention.

The additional image type information represents the type of an additional image when a receiving system decodes a video/audio stream to generate a 3-dimensional image, which is defined as illustrated in FIG. 10. For example, in the case of transmitting/receiving a stereoscopic video using a left/right image that is a basic type of a 3-dimensional image, an additional image is a left image 001 or a right image 011.

If the additional image type information is set to 'depth' or 'depth+residual data', the related parameters may be necessary. In this case, 'depth_parameter_flag' is set to '1' and the value (e.g., 'Knear' and 'Kfar' defined in ISO/IEC 14496-nn) is included. If the additional image type information is set to 'disparity' or 'disparity+disparity', 'disparity_parameter_flag' is set to '1' and the value (e.g., 'min_disparity' and 'max_disparity' defined in ISO/IEC 14496-nn) is included. Other information related to the additional image may also be included in the additional image type information.

Meanwhile, the additional image determination information (dependency_flag) of FIG. 9 may be used for two purposes.

First, the additional image determination information may be a parameter for determining whether a stream obtained by encoding a 3-dimensional additional image is independent or dependent. If the depencency_flag is '1', it indicates that a component is comprised of a dependent stream obtained by encoding (e.g., multi-view video coding (MVC)) an additional image with reference to a reference image, and accordingly the component can be decoded only when combined with a component corresponding to the reference image. On the other hand, if the dependency_flag is '0', it indicates that a component is comprised of a stream obtained by encoding (e.g., simulcast encoding) an additional image independently, and accordingly the component can be decoded independently. Consequently, if the depencency_flag is '1', the receiving system may include only one 3-dimensional video decoder; and the dependency_flag is '0', the receiving system may include two independent decoders.

Second, the dependency_flag indicates whether the corresponding component is dependent on a component for a reference image, and includes information for indicating the service and/or component of the reference image. In an example of FIG. 5, the same MH_service_id is used to interlock a reference image and an additional image, and location information of the service and/or component referred to by the additional image component is transmitted when dependency_flag=1. The location information may include ensemble_id, MH_service_id, IP_address, and UDP_port_num, which correspond to the two-dimensional broadcasting service and/or component referred to by the additional image component. Accordingly, the two-dimensional broadcasting service and the 3-dimensional broadcasting service may be recognized as different services in the receiving system. If dependency_flag=0, it indicates that location information of the service and/or component referred to by the additional image are not transmitted separately. Herein, the first purpose of the additional image determination information, i.e., the discrimination between cross-reference coding and independent coding may be replaced by defining component_type of FIG. 8 separately (e.g., Dependent Auxiliary stream component: component_type=43, Independent Auxiliary stream component: component_type=44).

FIG. 11 is a diagram illustrating the definition of 3-dimensional broadcasting service description information for providing 3-dimensional broadcasting service information in an embodiment of the present invention.

In an embodiment of the present invention, in order to describe information about a 3-dimensional broadcasting service in a service level, 3-dimensional broadcasting service description information (3D_service_descriptor) is defined as one type of the service description information (MH_service_level_descriptor) of FIG. 6 as illustrated in FIG. 11. Referring to FIG. 11, descriptor_tag is descriptor ID information separately allocated, and layer_id is 3-dimensional image ID information or layer ID information of a stream generated in 3-dimensional video encoding. If a stream of the corresponding service is generated by encoding an elementary image, the layer_id is allocated to '0'; and if a multi-view image transmitting a steam of several dependent layers, the value continues to increase according to the layers. If the type of a 3-dimensional image is limited to stereoscopic in consideration of the performance of the ATSC-M/H system, the layer_id value may be set by one bit. The layer_id may not be used according to circumstances because it is used to provide the dependency_flag function of FIG. 9 in the service description information level if a reference image and an additional image are divided by separate services (see FIG. 5).

StereoMono_service_flag is two-dimensional image conversion information, which is used to easily provide a two-dimensional/3-dimensional hybrid service. The receiving system converts a display mode to a two-dimensional mode or a 3-dimensional mode according to the StereoMono_service_ flag value. This can be used in various application services, for example, reducing the visual fatigue of a user by transmitting a two-dimensional image while providing a 3-dimensional broadcasting service.

3D_service_type is 3-dimensional broadcasting service type information representing the type of a 3-dimensional broadcasting service. The 3D_service_type is used to discriminate between a real-time 3-dimensional broadcasting service, a real-time/nonreal-time hybrid service, and a non-real-time 3-dimensional data broadcasting service.

3D_composition_type is 3-dimensional image structure information, which describes a method of constructing a 3-dimensional image after video/audio decoding. FIG. 12 is a diagram illustrating the definition of 3-dimensional image structure information in an embodiment of the present invention. 3-dimensional images provided by the transmitting system are classified into a dual-frame type providing a reference image and an additional image independently and a single-frame type providing a reference image and an additional image in one image format. In the case of the single-frame type, a reference image and an additional image are constructed by one image frame (e.g., a side-by-side type, a vertical line interleaved type, a horizontal line interleaved type, and a frame sequential type). L/R first indicates whether a reference image is a left image or a right image. The 3-dimensional image structure information may further include a variety of service information.

Meanwhile, the 3-dimensional broadcasting service description information (3D_service_descriptor) describes information in a service level. Therefore, if a reference image and additional image stream is transmitted throughout two ensembles, the 3-dimensional broadcasting service description information is included in a service map table included in an ensemble of the reference image or the additional image.

Figure 13:
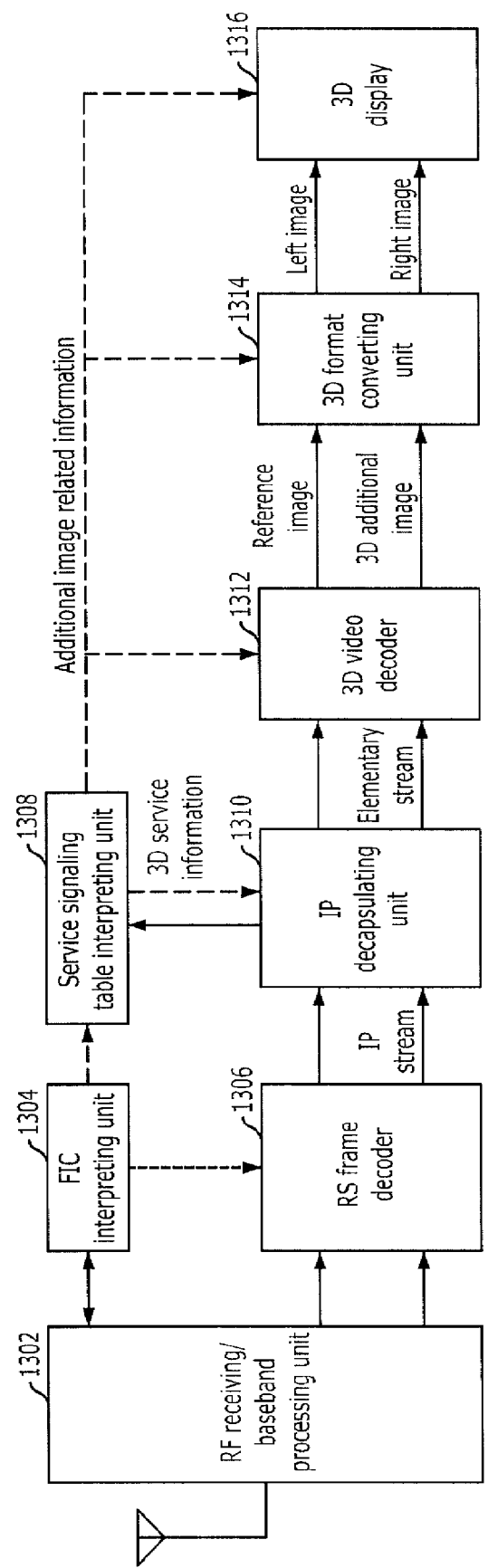
FIG. 13 is a block diagram of a system for receiving a 3-dimensional broadcasting service in accordance with a first embodiment of the present invention.

FIG. 13 is a block diagram of a system for receiving a 3-dimensional broadcasting service in accordance with a first embodiment of the present invention.

Referring to FIG. 13, a method for receiving a 3-dimensional broadcasting service in accordance with a first embodiment of the present invention includes an RF receiving/baseband processing unit 1302, an FIC interpreting unit 1304, an RS frame decoder 1306, a service signaling table interpreting unit 1308, an IP decapsulating unit 1310, a 3D video decoder 1312, a 3D format converting unit 1314, and a 3D display 1316.

The RF receiving/baseband processing unit 1302 performs reception of an RF broadcast signal, 8 VSB demodulation, and channel decoding. The FIC interpreting unit 1304 analyzes an effective service in channel search and ensemble information corresponding to the service and transfers, if a user selects a specific service, information for extraction of an RS frame in the corresponding parade to the RF receiving/baseband processing unit 1302.

The RF frame decoder 1306 extracts IP streams from an RS frame extracted through RS decoding. Herein, two RS frames must be simultaneously decoded if the user desires to receive a 3-dimensional broadcasting service; but only an RS frame and a parade transmitting a reference image may be decoded if the user desires to receive only a two-dimensional broadcasting service. Accordingly, it is possible to increase the power consumption efficiency of the receiving system. However, if a reference image and an additional image are simultaneously transmitted in one ensemble in consideration of the terminal implementation complexity, only one RS frame decoder and an IP decapsulating unit may be used to decode only one parade and one RS frame.

The service signaling table interpreting unit 1308 interprets various service signal table section information (e.g., SMT-MH and GAT-MH) transmitted through an M/H service signaling channel. Also, the service signaling table interpreting unit 1308 transfers 3-dimensional additional image related control information, acquired through the interpreted information, to the 3D video decoder 1312 and the 3D format converting unit 1314.

The IP decapsulating unit 1310 interprets RTP/UDP/IP protocol to divide a reference image and an additional image elementary stream carried by a payload of IP streams. Herein, the IP decapsulating unit 1310 uses an NTP timestamp received through a specific IP packet and a timestamp included in a reference image and an additional image IP packet (see FIG. 4) to control left/right images to be decoded and played at the same time.

The 3D video decoder 1312 includes one or two decoders according to the type of an additional image. The 3D format converting unit 1314 uses a 3D rendering algorithm to generate left/right images for representing a 3-dimensional image effect. Herein, the types of a reference image and an additional image for generating the left/right images and the type of the a 3D rendering algorithm for generating the left/right images may be determined by the 3D_service_type or 3D_composition_type defined in a 3D_service_descriptor and the MH_Component_data defined in an M/H component descriptor.

The 3D display 1316 operates in a two-dimensional mode or a 3-dimensional mode according to the StereoMono_service_flag value in the 3D_service_descriptor.

Embodiment 2

Figure 14:
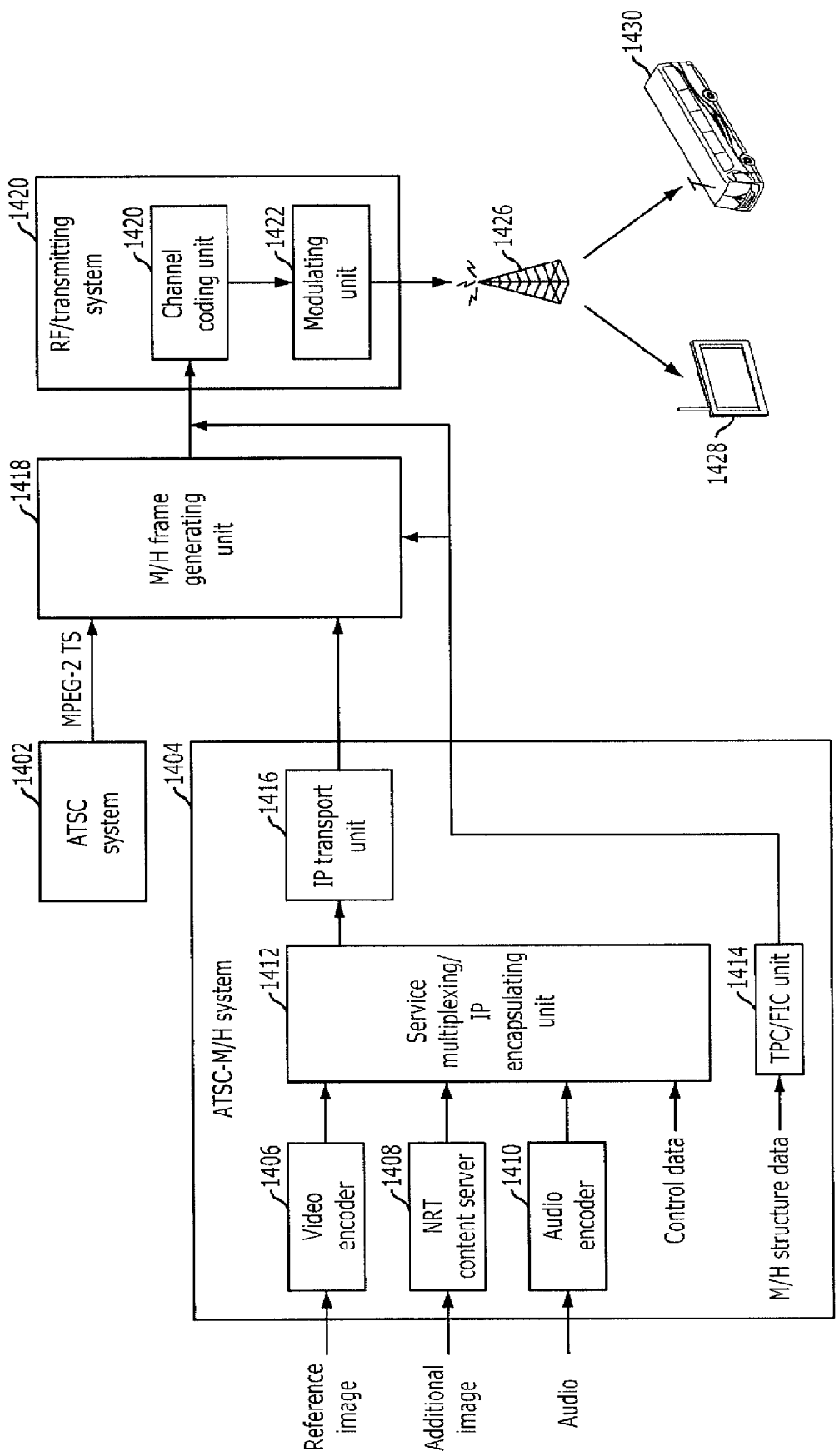
FIG. 14 is a block diagram of a method for transmitting a 3-dimensional broadcasting service in accordance with a second embodiment of the present invention.

FIG. 14 is a block diagram of a method for transmitting a 3-dimensional broadcasting service in accordance with a second embodiment of the present invention.

Referring to FIG. 14, a system for transmitting a 3-dimensional broadcasting service in accordance with a second embodiment of the preset invention includes an ATSC system 1402 for providing a conventional high-definition TV service, an ATSC-M/H system 1404 for providing a mobile broadcasting service, an M/H frame generating unit 1418 for generating an M/H frame by multiplexing transport streams outputted from the ATSC system 1402 and the ATSC-M/H system 1404, and an RF/transmitting system 1420 for performing channel coding and 8 VSB modulation to transmit an RF signal.

The ATSC system 1402 encodes and multiplexes a video/audio elementary stream. Herein, the transport stream includes an MPEG-2 transport stream (TS). However, in the case of the ATSC-M/H system 1404, the video/audio elementary stream includes an IP stream based on RTP protocol.

The ATSC-M/H system 1404 includes a video encoder 1406, an NRT content server 1408, an audio encoder 1410, a service multiplexing/IP encapsulating unit 1412, a transmission parameter channel/fast information channel (TPC/FIC) unit 1412, and an IP transport unit 1416.

In the first embodiment of the present invention, both of a reference image and an additional image are encoded and transmitted in real time. However, in the second embodiment of the present invention, only a reference image is encoded and transmitted in real time and an additional image is transmitted to a receiving system in nonreal time, for example, before the start of the main broadcast. In this manner, it is exemplarily described in the second embodiment of the present invention that a reference image is transmitted in real time and an additional image is transmitted in nonreal time. However, in another embodiment of the present invention, both of a reference image and an additional image may be transmitted in nonreal time.

Various contents such as videos, audios and texts for a 3-dimensional nonreal-time broadcasting service may be produced by a 3D camera or a 3D content authoring tool, stored in a storage device, and then transmitted by a transmitting system according to a service scenario.

In the second embodiment of the present invention, the video encoder 1406 receives and encoded and stored in a reference image in real time. Meanwhile, an additional image is beforehand inputted, encoded and stored in the NRT content server 1408 before the start of the broadcast. The NRT content server 1408 beforehand transmits the stored additional image to the receiving system in a file format. Thereafter, upon start of the broadcast, the ATSC-M/H system 1404 encodes a reference image in real time to perform a 3-dimensional nonreal-time broadcasting service. If only an additional image is transmitted in nonreal time, the receiving system needs a mechanism for synchronizing a real-time reference image and a nonreal-time additional image.

In another embodiment of the present invention, both of a reference image and an additional image may be provided in nonreal time. That is, both of a reference image and an additional image may be inputted, encoded and stored in the NRT content server 1408 before the start of the broadcast, and may then be transmitted to the receiving system in the format of video clip or an image sequence file. The receiving system stores received 3-dimensional images beforehand and then plays the stored 3-dimensional images simultaneously, thereby providing a 3-dimensional broadcasting service.

The audio encoder 1410 receives and encodes an audio corresponding to the 3-dimensional image inputted to the video encoder 1406 and the NRT content server 1408. In another embodiment of the present invention, an audio may also be encoded and transmitted in nonreal time.

The service multiplexing/IP encapsulating unit 1412 receives and multiplexes control data and the encoded video and audio outputted from the video encoder 1406 and the audio encoder 1410. Thereafter, the service multiplexing/IP encapsulating unit 1412 generates an IP datagram packet according to UDP/IP protocol. Herein, the control data includes the detailed information and structures of services provided through IP streams. The control data are generated and multiplexed in a separate IP stream. Also, in the second embodiment of the present invention, the control data include information for a nonreal-time service.

The TPC/FIC unit 1414 receives M/H structure data to generate transmission parameters and binding information between a physical transmission channel and a logical service that enables a fast access to an M/H service. The generated information is used for frame generation by the M/H frame generating unit 1418 and channel coding by a channel coding unit 1422 of the RF/transmitting system 1420, and is transmitted over a TPC/FIC channel that is a signaling channel.

The IP stream generated by the service multiplexing/IP encapsulating unit 1412 is transferred through the IP transport unit 1416 to the M/H frame generating unit 1418. The M/H frame generating unit 1418 generates an M/H frame by means of the received IP stream and transfers the M/H frame to the channel coding unit 1422 of the RF/transmitting system 1420. The channel-coded M/H frame is modulated by a modulating unit 1422 of the RF/transmitting system 1420, and the resulting signal is broadcasted through an antennal 1426. The broadcasted signal is received through a receiving terminal installed in a vehicle 1430 or a terminal 1428.

As described above, the ATSC-M/H system performs service signaling to a receiving terminal in a hierarchical structure. In the first step, the transmitting system provides binding information between a service and an ensemble through a fast information channel (FTC). In the next step, it transmits an M/H service signaling map table (e.g., SMT-MH and TAT-MH) included in an M/H service signaling channel IP stream (see ATSC-M/H Standard(A/193) Part 3). Among them, an SMT_MH is defined to transmit a current broadcast ensemble, a service and structure information about a service component. The SMT_MH, i.e., the service map table has been already described in the first embodiment of the present invention, and thus its detailed description will be omitted for conciseness.

In the present invention, a 3D_service_descriptor (see FIG. 11) is added in an M/H service level descriptor in an SMT_MH table to describe information about a 3DTV broadcasting service in a service level.

Meanwhile, as illustrated in FIG. 15, the ATSC-M/H transmitting system generates an NRT-IT (Nonreal-Time Information Table) for a nonreal-time (NRT) broadcasting service, i.e., a nonreal-time information table and transmits the same over a signaling channel (see Working Draft: Non-Real-Time Content Delivery (S13-1-026r14)). Herein, the NRT-IT includes information necessary for the receiving system to download a plurality of contents (e.g., a content title, a download effective time, and a content identifier (content_linkage)). Each content may include one or more files that may be transmitted/received by FLUTE protocol through an IP stream.

Referring to FIG. 15, Table_id is ID information for identifying an NRT-IT table section, and content_linkage is ID information for discerning contents provided through an NRT service. That is, the content_linkage in an FDT (File Description Table) of the file transmission protocol 'FLUTE' and the content_linkage in the NRT_IT are set to have the same value, thereby interlocking the contents described in the NRT_IT table and the files transmitted though the FLUTE protocol.

The ATSC-M/H defines descriptors of a content level for describing information about the respective contents through a content_descriptor. As illustrated in FIG. 16, the present invention newly defines a type for 3D additional information, among the component_types defined in the M/H_component_descriptor (e.g., component type 43=3D auxiliary component). Also, 3D contents may be defined as a new media type through a media_type( ) of a Media_type_descriptor.

The M/H_Component_Descriptor defined in the ATSC-M/H is the same as that in FIG. 7, and the definition of the MH_Component_data in the case of component_type=43 (i.e., the component type is 3D additional information) is the same as that of FIG. 9. This has been already described in the first embodiment of the present invention, and thus its detailed description will be omitted for conciseness.

Figure 17:
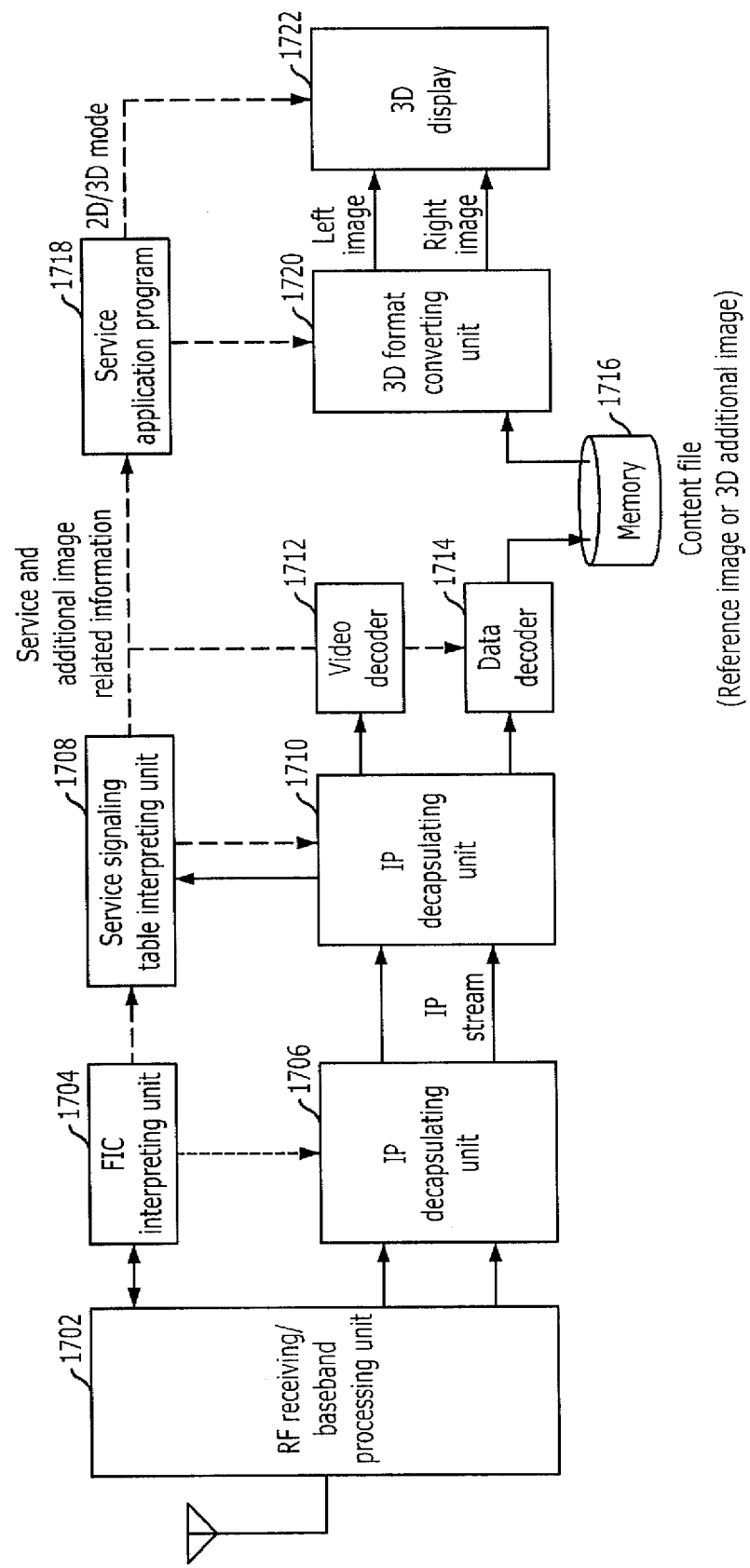
FIG. 17 is a block diagram of a system for receiving a 3-dimensional broadcasting service in accordance with a second embodiment of the present invention.

FIG. 17 is a block diagram of a system for receiving a 3-dimensional broadcasting service in accordance with a second embodiment of the present invention.

Referring to FIG. 17, a system for receiving a 3-dimensional broadcasting service in accordance with a second embodiment of the present invention includes an RF receiving/baseband processing unit 1702, an FIC interpreting unit 1704, an RS frame decoder 1706, a service signaling table interpreting unit 1708, an IP decapsulating unit 1710, a video decoder 1712, a data decoder 1714, a memory 1716, a service application program 1718, a 3D image format processing unit 1720, and a 3D display 1722.

The RF receiving/baseband processing unit 1702 performs reception of an RF broadcast signal, 8 VSB demodulation, and channel decoding. The FIC interpreting unit 1704 analyzes an effective service in channel search and ensemble information corresponding to the service and transfers, if a user selects a specific service, information for extraction of an RS frame in the corresponding parade to the RF receiving/baseband processing unit 1702.

The RF frame decoder 1706 extracts IP streams from an RS frame extracted through RS decoding. The IP decapsulating unit 1710 interprets RTP/UDP/IP protocol to divide a reference image and an additional image elementary stream carried by a payload of IP streams.

The service signaling table interpreting unit 1708 interprets various service signal table section information (e.g., SMT-MH, GAT-MH and NRT_IT) transmitted through an M/H service signaling channel. Also, the service signaling table interpreting unit 1708 transfers 3-dimensional additional image related control information, acquired through the interpreted information, to the IP decapsulating unit 1710, the video decoder 1712, the data decoder 1714, and the service application program 1718. On the basis of the control information, the broadcasting receiving system extracts and decodes a content file, a video/audio stream and an IP stream corresponding to a service selected by the user. In this process, the data decoder 1714 receives information such as contents linkage from the service signaling table interpreting unit 1708 or the service application program 1718, and selects and downloads content files necessary for an NRT service in an effective time slot according to content file transmission protocol (e.g., FLUTE). The downloaded content files are stored in the memory 1716, and it is called by the service application program 1718 and processed by the 3D image format processing unit 1720.

The 3D image format processing unit 1720 receives a reference image and an additional image determined according to 3-dimensional service related signaling information and uses a 3D rendering algorithm, suitable for the received imaged, to generate left/right images for representing a 3-dimensional image effect. Herein, the types of a reference image and an additional image for generating the left/right images and the type of the a 3D rendering algorithm for generating the left/right images may be determined by the 3D_service_type or 3D_composition_type defined in a 3D_service_descriptor and the MH_Component_data defined in an M/H component descriptor.

On the basis of the 3-dimensional broadcasting service related signaling information and the standardized service specification, the service application program 1718 controls the video decoder 1712, the data decoder 1714, the memory 1716 and the 3D image format processing unit 1720 to provide a nonreal-time broadcasting service to the user.

The 3D display 1722 operates in a two-dimensional mode or a 3-dimensional mode according to the StereoMono_service_flag value in the 3D_service_descriptor.

A description has been given of the 3-dimensional broadcasting service providing method and system of the present invention through the embodiments. The method for transmitting a 3-dimensional broadcasting service in accordance with an embodiment of the present invention transmits a service signaling table for a 3-dimensional broadcasting service, together with a reference image and an additional image, to the receiving system. An example of the service signaling table is a service map table (SMT-MH) described through the embodiments of the present invention. Specifically, the service signaling table also includes a nonreal-time information table (NTR-IT) transmitted to provide nonreal-time broadcast or real-time/nonreal-time hybrid broadcast.

FIG. 18 is a table illustrating components included in a service signaling table according to the type of a 3-dimensional broadcasting service in an embodiment of the present invention.

Referring to FIG. 18, a real-time broadcasting service, a real-time/nonreal-time hybrid broadcasting service and a nonreal-time broadcasting service are divided by the 3D_service_type of a 3D_Service_descriptor. In the real-time/nonreal-time hybrid broadcasting service, a 3D additional image is transmitted through a file transmission mechanism using FLUTE protocol, and service component (component #2) information is described in an M/H_Component_Descriptor of the SMNT-MH (e.g., an IP address, a port number, and a component-type). Also, a content_linkage is additionally defined to indicate a file transmitted through FLUTE protocol, and a component_type is defined as a 3D auxiliary component to transfer information about the format of an additional image, and a descriptor is used to describe information necessary for image processing such as 3D rendering (see FIG. 9).

In order to provide a nonreal-time 3-dimensional broadcasting service, for a general terminal supporting only a two-dimensional mode, a reference image and an additional image are generated and transmitted as additional contents (contents #2 and contents #3) through additional components (a component #3 and a component #4). Herein, if the contents are a video clip, the content-types of the M/H_component_descriptors of the respective contents are set respectively to an H.264/AVC video stream and a 3D auxiliary component; and if the contents are another media type such as a still image, the content type is set through the media_type( ) of the Media_type_descriptor.

Also, in order to provide a nonreal-time 3-dimensional broadcasting service, for a 3D dedicated application service, one content (a content #4) may be generated and transmitted through one component (a component #5). Herein, one content file needs 3D image processing such as left/right image division after being downloaded by the receiving system.

As described above, the present invention provides method and system for providing a real-time or nonreal-time 3-dimensional broadcasting service while guaranteeing the compatibility with general two-dimensional broadcast by means of ATSC-M/H standards. The use of the present invention makes it possible to provide an indoor high-definition TV service by one RF signal through an ATSC system and to simultaneously provide a two-dimensional broadcasting service and a 3-dimensional broadcasting service in mobile environments through an ATSC-M/H system.

While the present invention has been described with respect to the specific embodiments, it will be apparent to those skilled in the art that various changes and modifications may be made without departing from the spirit and scope of the invention as defined in the following claims.

What is claimed is:

1. A method for transmitting a 3-dimensional broadcasting service, comprising:
   encoding a reference image and an additional image of the 3-dimensional broadcasting service to generate a reference image stream and an additional image stream;
   receiving a service map table defining the 3-dimensional broadcasting service; and
   transmitting the reference image stream, the additional image stream and the service map table in real time,
   wherein the reference image stream and the additional image stream are allocated with a same service ID information in the service map table, and
   wherein the reference image stream, the additional image stream, and the service map table are transmitted as a dual frame type in order to provide simultaneously a two-dimensional broadcasting service and the 3-dimensional broadcasting service.

2. The method of claim 1, wherein the service map table comprises the service ID information, multi-ensemble information, service type information, component description information, and service description information.

3. The method of claim 2, wherein the component description information comprises component type information and component data information.

4. The method of claim 3, wherein the component data information comprises additional image determination information and additional image type information.

5. The method of claim 2, wherein the service description information comprises 3-dimensional image ID information, two-dimensional image conversion information, 3-dimensional broadcasting service type information, and 3-dimensional image structure information.

6. The method of claim 1, further comprising:
   receiving a nonreal-time information table; and
   transmitting the nonreal-time information table,
   wherein at least one of the reference image stream and the additional image stream is transmitted in nonreal time together with the nonreal-time information table.

7. The method of claim 6, wherein the nonreal-time information table includes content ID information and content description information.

8. The method of claim 1, further comprising:
   encoding and multiplexing a video elementary stream of the two-dimensional broadcasting service to output a transport stream;
   multiplexing the encoded reference image stream and the additional image stream to output an IP stream;
   generating a frame by multiplexing the transport stream and the IP stream; and
   transmitting the frame over a signaling channel.

9. The method of claim 1, further comprising inserting a same timestamp in the reference image and the additional image.

10. The method of claim 1, wherein the reference image stream and the additional image stream are transmitted throughout two ensembles.

11. A method for receiving a 3-dimensional broadcasting service, comprising:
    receiving in real time a broadcast signal including a reference image stream and an additional image stream of the 3-dimensional broadcasting service and a service map table defining the 3-dimensional broadcasting service;
    acquiring the reference image stream, the additional image stream and the service map table from the broadcast signal; and
    decoding the reference image stream and the additional image stream by means of the service map table,
    wherein the reference image stream and the additional image stream are allocated with a same service ID information in the service map table, and
    wherein the reference image stream, the additional image stream, and the service map table are received as a dual frame type in order to provide simultaneously a two-dimensional broadcasting service and the 3-dimensional broadcasting service.

12. The method of claim 11, wherein the service map table comprises the service ID information, multi-ensemble information, service type information, component description information, and service description information.

13. The method of claim 12, wherein the component description information comprises component type information and component data information.

14. The method of claim 13, wherein the component data information comprises additional image determination information and additional image type information.

15. The method of claim 12, wherein the service description information comprises 3-dimensional image ID information, two-dimensional image conversion information, 3-dimensional broadcasting service type information, and 3-dimensional image structure information.

16. The method of claim 11, further comprising receiving a nonreal-time information table,
    wherein at least one of the reference image stream and the additional image stream is received in nonreal time together with the nonreal-time information table, and the nonreal-time information table is used to decode the nonreal-time reference image stream or additional image stream.

17. The method of claim 16, wherein the nonreal-time information table comprises content ID information and content description information.

18. A system for transmitting a 3-dimensional broadcasting service, comprising:
an encoding unit configured to encode a reference image and an additional image of the 3-dimensional broadcasting service to generate a reference image stream and an additional image stream;
an input unit configured to receive a service map table defining the 3-dimensional broadcasting service; and
a transmitting unit configured to transmit the reference image stream, the additional image and the service map table in real time,
wherein the reference image stream and the additional image stream are allocated with a same service ID information in the service map table, and
wherein the reference image stream, the additional image stream, and the service map table are transmitted as a dual frame type in order to provide simultaneously a two-dimensional broadcasting service and the 3-dimensional broadcasting service.

19. The system of claim 18, wherein the service map table comprises the service ID information, multi-ensemble information, service type information, component description information, and service description information.

20. The system of claim 18, wherein the input unit receives a nonreal-time information table and the transmitting unit transmits the nonreal-time information table,
wherein at least one of the reference image stream and the additional image stream is transmitted in nonreal time together with the nonreal-time information table.

21. A system for receiving a 3-dimensional broadcasting service, comprising:
a fast information channel (FIC) interpreting unit configured to analyze an effective service in channel search;
a receiving unit configured to receive in real time a broadcast signal including a reference image stream and an additional image stream of the 3-dimensional broadcasting service and a service map table defining the 3-dimensional broadcasting service;
a signal processing unit configured to acquire the reference image stream, the additional image stream and the service map table from the broadcast signal; and
a decoding unit configured to decode the reference image stream and the additional image stream by means of the service map table,
wherein the reference image stream and the additional image stream are allocated with a same service ID information in the service map table, and
wherein the reference image stream, the additional image stream, and the service map table are received as a dual frame type in order to provide simultaneously a two-dimensional broadcasting service and the 3-dimensional broadcasting service.

22. The system of claim 21, wherein the service map table comprises the service ID information, multi-ensemble information, service type information, component description information, and service description information.

23. The system of claim 21, wherein the receiving unit receives a nonreal-time information table,
wherein at least one of the reference image stream and the additional image stream is received in nonreal time together with the nonreal-time information table, and the nonreal-time information table is used to decode the nonreal-time reference image stream or additional image stream.

24. A system for transmitting a 3-dimensional broadcasting service, comprising:
an advanced television systems committee (ATSC) unit configured to provide a high-definition TV service as a two-dimensional broadcasting service in the transmitted 3-dimensional broadcasting service;
an advanced television systems committee—Mobile/Handheld (ATSC-M/H) unit configured to provide a mobile broadcasting service;
a mobile/handheld (M/H) frame generating unit configured to generate an M/H frame by multiplexing transport streams outputted from the ATSC unit and the ATSC-M/H unit; and
an RF transmitting unit configured to perform channel coding and modulation to transmit an RF signal,
wherein the ATSC unit interlocks and synchronizes a network time protocol (NTP) clock of an NTP server and a system time clock (STC) used to extract system time information of a transport stream, thereby implementing media synchronization between the ATSC unit and the ATSC-M/H unit.

* * * * *